3,538,321
MULTIPLE LIGHT TRANSMISSION FROM A
SINGLE LIGHT SOURCE
Bruce Cameron Longenecker and Joseph Richard Keller, Harrisburg, Pa., assignors to AMP Incorporated, Harrisburg, Pa.
Filed Apr. 18, 1967, Ser. No. 631,697
Int. Cl. F21
U.S. Cl. 240—1
11 Claims

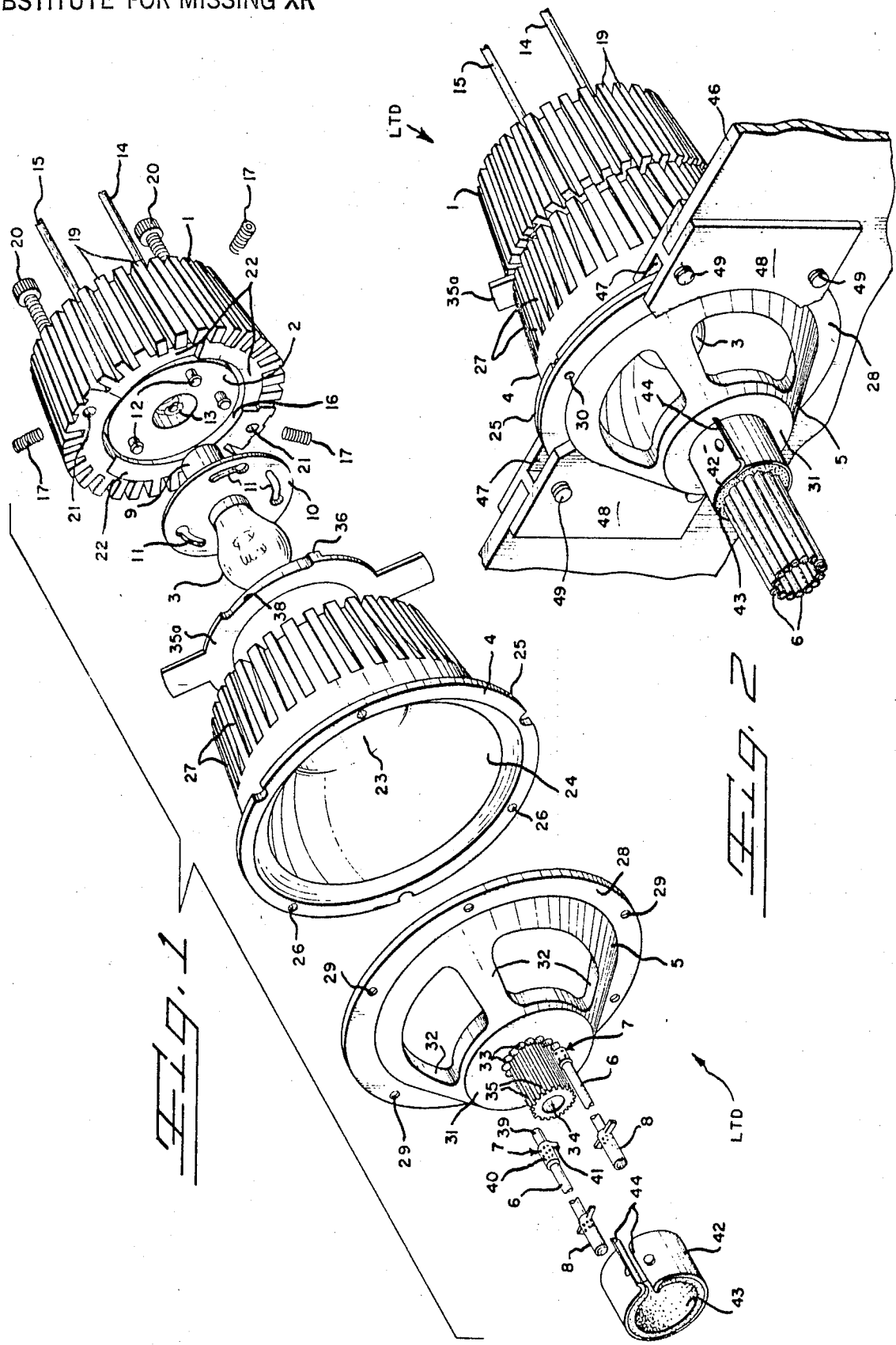

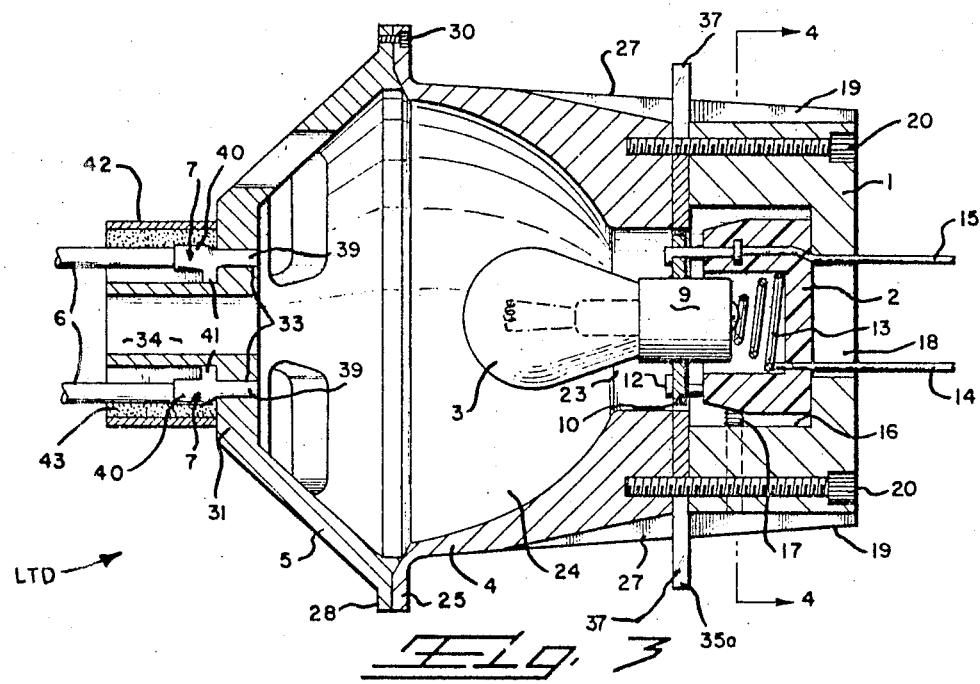
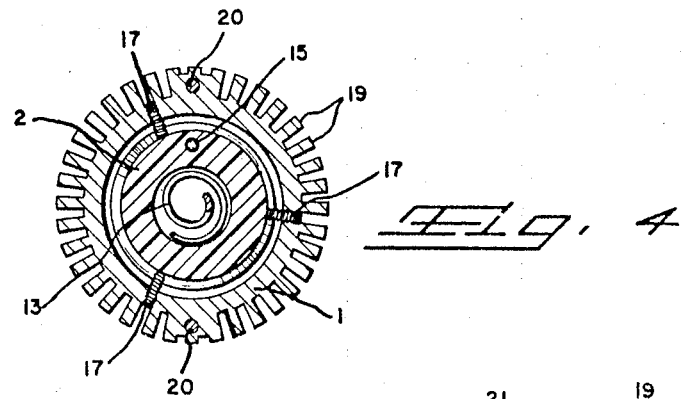
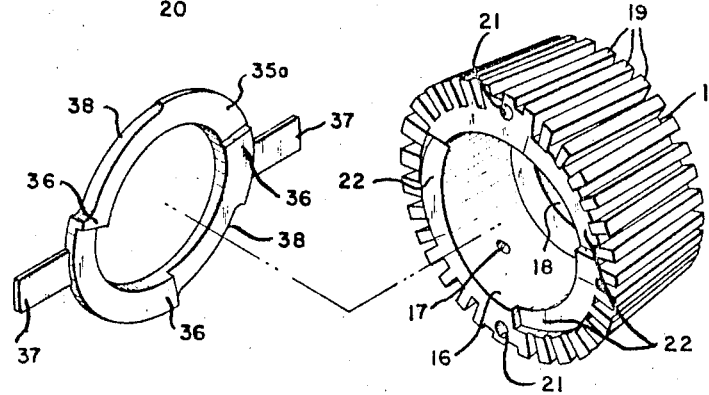

ABSTRACT OF THE DISCLOSURE

A light source for providing a uniform area and intensity of light from a reflective member onto ends of light-conducting members carried in a mounting member adjacent the reflective member. A light bulb providing the light is axially adjustable relative to the reflective member to provide an optimum uniform area and intensity of light.

---

This invention relates to light transmission and more particularly to multiple light transmission from a single light source.

In applications in which light is used as a medium to transmit intelligence, to provide illumination, to provide sensing, signalling and monitoring, or the like, the general practice is to provide complex systems of electric light bulbs, electric wiring, and, in some cases, relay or electronic components to complete the intended function. Such systems are expensive, their reliability is dependent upon all parts functioning properly and their flexibility is limited.

U.S. patent application Ser. No. 591,254, filed Nov. 1, 1966, now abandoned, discloses a multiple-light transmission device; however, this device proved to have several drawbacks. One drawback is the fact that the light from the reflective member did not provide a uniform area and intensity of light onto the ends of the light-conducting members. Another drawback is the lack of any efficient means to provide adjustment of the light source along the axis or relative thereto.

A further drawback is the angular disposition of the light-conducting members in the mounting member which created problems of space and stress on the light-conducting members.

An object of the invention is to provide a light-transmission device wherein a number of light transmission members transmits light from a single light source.

Another object is the provision of a multiple light-transmission device having a reflection means to utilize in an optimum manner the light from a single light bulb.

A further object is to provide a multiple light-transmission device including a mounting means in which the ends of light transmitting members are removably mounted in an optimum disposition relative to light-reflecting means to receive the greatest intensity of light emanating from the light bulb.

An additional object is the provision of means on the reflecting means or between the light bulb and the ends of the light-transmitting members to absorb unwanted spectra of the light emanating from the light bulb.

A still further object is to provide means on the multiple light-transmitting device to prevent heat build-up by the light bulb.

Still a further object is the provision of means to adjust the light bulb along the axis or relative thereto.

Other objects and attainments of the present invention will become apparent to those skilled in the art upon a reading of the following detailed description when taken in conjunction with the drawings in which there are shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing and other objects are achieved by a preferred embodiment of a multiple light-transmission device which comprises a reflecting member having a light bulb receiving means for receiving a light bulb therein, mounting means on the reflecting member, and light-transmitting members having ends secured in the mounting means and positioned therein to receive light of uniform intensity over a uniform area reflected from the reflecting member.

In the drawings:

FIG. 1 is an exploded perspective view of a light-transmission device;

FIG. 2 is a view similar to FIG. 1 in an assembled condition;

FIG. 3 is a cross-sectional view of the light-transmission device of FIG. 2;

FIG. 4 is a view along lines 4—4 of FIG. 3; and

FIG. 5 is an exploded perspective view showing the adjustment feature.

Turning now to the drawings, a light-transmission device LTD is illustrated in FIGS. 1 through 5. The light transmission device includes a lamp socket carrying member 1, a bulb socket 2, a light bulb 3, a reflector 4, a mounting member 5, light-transmitting or conducting members 6 and terminal members 7 and 8 secured on the ends of light-transmitting members 6.

Bulb socket 2 receives metallic base 9 of light bulb 3. Base 9 includes collar 10 having bayonet openings 11 mateable with lugs 12 on socket 2 in order to maintain light bulb 3 in position within socket 2 and to define an outer electrical contact for light bulb 3. Socket 2 also includes a spring 13 therein which is electrically connected to electrical lead 14. Another electrical lead 15 is electrically connected to one of lugs 12.

Lamp socket carrying member 1 has an opening 16 in which socket 2 is disposed and set screws 17 engage socket 2 to adjust the socket so that light bulb 3 is movable relative to the reflective axis. An opening 18 is located in the end of member 1 through which leads 14 and 15 pass. Fins 19 extend outwardly from the exterior surface of member 1. Bolts 20 extend through holes 21 to threadably hold member 1 on reflector 4. Cam surfaces 22 are disposed in the front surface of member 1.

Reflector 4 is made from any suitable material and includes an opening 23 through which light bulb 3 passes and a reflection surface 24 defining a skewed elliptical reflection surface. Reflector 4 also includes a flange 25 having threaded openings 26 equally spaced therearound. Fins 27 extend outwardly from the exterior surface of reflector 4. Fins 19 and 27 provide heat dissipating means.

Mounting member 5 comprises an annular member 28 having openings 29 which are mateable with openings 26 so that screws 30 secure reflector 4 and mounting member 5 together. A housing 31 is spaced from annular member 28 and is connected thereto by legs 32. Openings 33 extend through housing 31 and they are equally spaced around a tubular member 34 which is provided with channels 35. Each of channels 35 is in communication with a respective opening 33. Each opening 33 is disposed in a parallel manner with respect to the longitudinal axis of mounting member 5. The open spaces between legs 32 and the opening through tubular member 34 provide ventilation to aid in dissipating the heat generated by the light bulb.

Adjustment ring 35a is disposed between member 1 and reflector 4 and it includes cam members 36 mateable with cam surfaces 22 and legs 37 which extend outwardly from the exterior surfaces of member 1 and reflector 4. Recesses 38 are located in opposing relationship in the periphery of ring 35a to permit clearance from screws 20 and to define stop means thereby limiting the rotation of adjustment ring 35a relative to member 1 and reflector 4.

In order to adjust bulb 3 along the longitudinal axis of the light-transmission device, screws 20 are loosened, ring 35a is rotated via legs 37 causing cam members 36 to move in cam surfaces 22 thereby moving member 1 and light bulb 3 secured therein relative to reflector 4.

Terminal member 7 includes first section 39 and an insulation-engaging section 40. Lugs 41 are located at the junction between sections 39 and 40. Insulation support section 40 includes openings having inwardly-beveled sections located on the inner surface of section 40 which are generally of a frusto-conical configuration.

Termination members 7 are susceptible to mass production by automatic machinery and are conveniently formed by shaping a sheet metal blank or strip of a suitable material such as brass or the like in successive forming steps. The metal is sufficiently hard and resilient and has spring-like characteristics, yet it is sufficiently malleable to permit crimping of the termination members onto light-transmitting members 6 to effect an excellent mechanical connection therewith.

Light-transmitting members 6 comprise a covering member of compressible and resilient plastic surrounding light-transmitting elements made from any suitable light-transmitting material and the number of light-transmitting elements depends upon the amount of light to be transmitted. Each of the light-transmitting elements is surrounded with a coating of material having reflecting characteristics so as to transmit the light therealong. The light-transmitting members are preferably of the type manufactured by E. I. du Pont de Nemours and Company under the trademark Crofon. Of course, any type of light-transmitting members may be used.

The light-transmitting members are flexible so that in bending the light-transmitting elements to accommodate a desired situation, the light-transmitting elements move relative to each other, and, if the ends of the light-transmitting members are not properly terminated, the ends of the light-transmitting elements extend outwardly from the ends of the covering member in an irregular manner thereby resulting in an improper alignment for the ends of the light-transmitting elements. The light-transmitting members are therefore most effective when the ends of all of the light-transmitting elements are located in the same or substantially the same place.

To assemble a terminal 7 onto the light-transmitting member, it is stripped to bear a portion of the ends of the light-transmitting elements and the stripped light-transmitting member is placed within the termination member with the light-transmitting elements disposed within section 39 while the covering member is disposed within section 40. The U-shaped configuration of the terminal member makes it easy for the stripped light-transmitting member to be placed within the terminal member; however, the terminal member may be formed in any other desirable manner so long as the light-transmitting member can be inserted therewithin.

With the light-transmitting member in position within the terminal member, the terminal member is subjected to a crimping operation by crimping dies (not shown) to crimp the terminal member onto the light-transmitting member. The terminal member is crimped onto the light-transmitting member in accordance with the disclosure of U.S. patent application, Ser. No. 557,797, filed June 15, 1966, so as not to restrict the transmission characteristics of the light-transmitting member.

The crimping dies preferably form sections 39 and 40 into a circular configuration onto the light-transmitting elements and covering member. It is to be understood, however, that these sections can be formed into other geometrical configurations as desired to accommodate a desired purpose. Thus, the light-transmitting elements are collected in a dense and substantially uniform manner of desired geometrical configuration. The crimping dies engage sections 39 and 40 and not lugs 41. As section 40 is being crimped onto the covering member, the inwardly-beveled sections around the openings penetrate the covering member so as to securely position the terminal member on the light-transmitting member. Thus, section 40 defines a strain-relief means for the terminal member. In the event that the light-transmitting member is not to be subjected to undue strains, sections 39 can be used to terminate the stripped light-transmitting member and section 39 can be eliminated. Terminal member 8 is of the type disclosed in U.S. patent application, Ser. No. 569,726, filed Aug. 2, 1966.

As illustrated in FIGS. 1–3, terminated terminal members 7 are disposed in openings 33 in accordance with the disposition of openings 33 relative to the longitudinal axis of mounting member 5. Lugs 41 are disposed in channels to limit the inner movement of the terminal members within openings 33 so that the ends of terminal members 7 are disposed at the inner ends of openings 33 to receive reflected light from reflecting surface 24. Clip 42 has a lining 43 of pliable material that is disposed on tubular member 34 in engagement with terminal members 7 to hold the terminal members in position thereon via interengaging legs 44.

The disposition of terminal members 7 within openings 30 permits the greatest intensity of light reflected from reflecting surface 24 to be received by the light-transmitting members because the skewed elliptical-reflecting surface accomplishes this important feature. Thus, the proper spatial disposition of the light-transmitting members relative to the major axis of the skewed elliptical-reflecting surface determines the uniform intensity of the light to be received by the light-transmitting members.

Reflective surface 24 is unique in that it provides a substantially uniform ring of reflected light with a predetermined radius at a predetermined distance from the reflective surface. The ends of the terminated light-conducting members are positioned in a plane at the inner surface of housing 31 whereat the uniform ring of light from reflective surface 24 occurs thereby resulting in near uniform intensity of light for each of the light-conducting members and a minimum amount of light loss. The reflective surface is therefore an important feature to accomplish the intended purpose. Intensity of the reflected light at various points was found to be within ±10% of the average intensity thereby verifying the substantially uniform intensity of the reflected light. If desired, more than one annular row of light-transmitting members may be provided in housing 28. Adjustment ring 35a permits axial adjustment of the light bulb and screws 17 permit adjustment relative to the axis.

Filters may be placed between the light source and the plane of the ends of the light-transmitting members to filter out an unnecessary part of the light spectrum. Also, instead of filters, the reflecting surface may be coated with the light-absorbing substance to absorb the unnecessary part of the light spectrum. Any heat-dissipating means other than the ribs may be applied to the exterior surface of the reflector to dissipate heat therefrom.

A mounting bracket 46 has an opening 47 therein to receive flange 25 of reflector 4 and flange 28 of mounting member 5 to mount the light-transmission device via brackets 48 held together by screws 49 as illustrated in FIG. 2.

As can be discerned, a light-transmission device has been disclosed to transmit via light-transmitting members multiple light transmission from a single light source.

It will, therefore, be appreciated that the aforementioned and other desirable objects have been achieved;

however, it should be emphasized that the particular embodiment of the invention, which is shown and described herein, is intended as merely illustrative and not as restrictive of the invention.

The invention is claimed in accordance with the following:

1. A multiple light-transmission device comprising a reflecting member having a reflective surface, light bulb-receiving means for receiving a light bulb therein, means mounting said reflecting member and said light bulb-receiving means together, mounting means on the reflecting member, light-transmitting means defining elongated light-transmitting members having end means secured in the mounting means and positioned therein to receive light reflected from the reflective surface and transmit the received light to points remote from said light-transmission device, and adjustment means to adjust said light bulb along a longitudinal axis of said device for providing light of substantially uniform area and intensity at the end means of said light-transmitting means.

2. A multiple light-transmission device according to claim 1 wherein means are provided on said reflecting member and said mounting means to removably secure said reflecting member and said mounting means together.

3. A multiple light-transmission device according to claim 1 wherein means are provided on said mounting means and the ends of said light-transmitting members to removably secure the ends of said light-transmitting members in said mounting means.

4. A multiple light-transmission device according to claim 1 wherein said reflecting member has a skewed elliptical-reflecting surface.

5. A multiple light-transmission device according to claim 1 wherein said mounting means is provided with openings to prevent high heat.

6. A multiple light-transmission device according to claim 1 wherein light-absorbing means is disposed between said light bulb and the ends of said light-transmitting members to absorb unwanted spectra.

7. A multiple light-transmission device according to claim 1 wherein said reflecting member and said light bulb-receiving means include fin means for dissipating heat generated by said light bulb.

8. A multiple light-transmission device according to claim 1 wherein additional adjustment means are disposed in said light bulb-receiving means for adjusting said light bulb relative to said longitudinal axis.

9. A lighting system comprising a socket-carrying means, a socket member for receiving a light bulb therein disposed in said socket-carrying means, a light-reflecting member extending outwardly from said socket-carrying means and having a reflective surface for reflecting light emanating from said light bulb, a series of flexible light-transmitting members, mounting means on said light-reflecting member to mount ends of said light-transmitting members to receive the reflecting light from said reflective surface, means securing ends of the light-transmitting members on said mounting means, and means for adjusting said light bulb along a longitudinal axis of said light-reflecting member and relative thereto, said means for adjusting being secured coaxially with said axis.

10. A lighting system according to claim 9 wherein the ends of said light-transmitting members are disposed substantially concentric with respect to said longitudinal axis of said light-reflecting member.

11. A light-transmission device comprising light-source means to generate light, reflection means disposed adjacent said light-source means and having reflective surface means to reflect said light generated by said light-source means, mounting means on said reflection means, light-transmitting means having end means secured in said mounting means for receiving said light reflected by said reflective surface means and for transmitting the received light to a point remote from said light-transmission device, and adjustment means operatively connected to said light-source means for adjusting said light-source means along a longitudinal axis of said reflection means and relative thereto.

References Cited

UNITED STATES PATENTS

| | | | |
|---|---|---|---|
| 1,687,347 | 10/1928 | Moru | 240—44 |
| 1,774,124 | 8/1930 | Arbuckle | 240—44.2 |
| 2,512,948 | 6/1950 | Levy | 240—47 |
| 2,689,908 | 9/1954 | Simonds | 240—41 X |
| 3,270,192 | 8/1966 | Watson | 240—46.59 X |
| 3,371,202 | 2/1968 | Moore et al. | 240—41.15 |

JOHN M. HORAN, Primary Examiner

R. A. WINTERCORN, Assistant Examiner

U.S. Cl. X.R.

240—2.18, 8.18, 41.15, 44, 44.2, 47